United States Patent
Vernet et al.

(10) Patent No.: US 7,309,110 B2
(45) Date of Patent: Dec. 18, 2007

(54) WHEEL WITH COMPOSITE RIM PRODUCED BY RESIN TRANSFER MOLDING

(75) Inventors: Yves Vernet, Cournon-d'Auvergne (FR); Matthieu Bonnamour, Pont-du-Chateau (FR); Adam Jara, Clermont-Ferrand (FR); Georges Pirin, Chauriat (FR)

(73) Assignee: Michelin Recherche et Technique S.A. (CH)

( * ) Notice: Subject to any disclaimer, the term of this patent is extended or adjusted under 35 U.S.C. 154(b) by 0 days.

(21) Appl. No.: 10/938,672

(22) Filed: Sep. 10, 2004

(65) Prior Publication Data
US 2005/0062338 A1    Mar. 24, 2005

Related U.S. Application Data

(63) Continuation of application No. PCT/EP03/02346, filed on Mar. 7, 2003.

(30) Foreign Application Priority Data
Mar. 11, 2002 (FR) .................................. 02 03030

(51) Int. Cl.
*B60B 21/02* (2006.01)
(52) U.S. Cl. .............................. 301/95.102; 301/64.703; 301/95.104; 301/95.107; 152/516
(58) Field of Classification Search .......... 301/63.107, 301/64.201, 64.301, 64.302, 64.303, 64.306, 301/64.701, 64.702, 95.101, 95.102, 95.103, 301/95.104, 95.106, 95.107, 64.703; 280/250.1; 152/158, 520, 516
See application file for complete search history.

(56) References Cited

U.S. PATENT DOCUMENTS

| 4,000,926 A | | 1/1977 | Wlcox | |
| 4,030,754 A | * | 6/1977 | Merlette | ................ 301/95.103 |

(Continued)

FOREIGN PATENT DOCUMENTS

EP    0 796 747    9/1997

(Continued)

OTHER PUBLICATIONS

International Search Report (ISR) PCT/EP 03/02346, completed Jun. 17, 2003.

*Primary Examiner*—Russell D. Stormer
(74) *Attorney, Agent, or Firm*—Fitzpatrick, Cella, Harper & Scinto

(57) ABSTRACT

A wheel formed by the assembly of a disc comprising a hub bearing surface, a transition zone and a radially outer edge, and of a rim with at least a first laminated composite structure formed of at least one fabric of long fibers which are oriented in two distinct directions and impregnated by a cross-linked resin, the radially outer surface of which corresponds to the radially outer surface of the rim or to part thereof, at least a second laminated composite structure formed of at least one fabric of long fibers which are oriented in two distinct directions and impregnated by a cross-linked resin, the radially outer surface of which corresponds to the radially inner surface of the rim or to part thereof, and at least a circumferential weight-reduction structure formed of a material of low density, arranged radially between the first and second laminated composite structures.

13 Claims, 4 Drawing Sheets

U.S. PATENT DOCUMENTS

| | | | |
|---|---|---|---|
| 4,035,028 A * | 7/1977 | Wilcox | 301/13.2 |
| 4,153,657 A | 5/1979 | Wilcox | |
| 4,173,992 A * | 11/1979 | Lejeune | 152/381.3 |
| 4,252,378 A * | 2/1981 | DeBolt et al. | 301/64.702 |
| 4,294,490 A * | 10/1981 | Woelfel | 301/64.703 |
| 4,483,729 A * | 11/1984 | Fujisaki et al. | 156/222 |
| 4,749,235 A * | 6/1988 | McDougall | 301/64.703 |
| 5,028,065 A * | 7/1991 | Danecker | 280/250.1 |
| 5,080,444 A * | 1/1992 | Hopkins et al. | 301/95.107 |
| 5,249,846 A * | 10/1993 | Martin et al. | 301/95.102 |
| 5,549,360 A * | 8/1996 | Lipeles | 301/64.703 |
| 5,891,279 A * | 4/1999 | Lacour | 152/520 |
| 5,985,072 A * | 11/1999 | Finck et al. | 156/184 |
| 6,138,730 A * | 10/2000 | Fotij et al. | 152/398 |
| 6,470,934 B2 * | 10/2002 | Heuze et al. | 152/158 |
| 6,598,633 B1 * | 7/2003 | Pompier et al. | 152/158 |
| 6,736,463 B2 * | 5/2004 | Bazzoni et al. | 301/64.306 |
| 6,814,114 B2 * | 11/2004 | Bouvier et al. | 152/158 |
| 2003/0005991 A1 * | 1/2003 | Drap | 152/158 |
| 2003/0189373 A1 * | 10/2003 | Spoelstra | 301/64.703 |
| 2005/0126672 A1 * | 6/2005 | Ratet et al. | 152/520 |

FOREIGN PATENT DOCUMENTS

| | | |
|---|---|---|
| EP | 0 842 757 | 5/1998 |
| WO | WO 91 07289 | 5/1991 |
| WO | WO 97 09181 | 3/1997 |
| WO | WO 00 05083 | 3/2000 |

* cited by examiner

WHEEL WITH COMPOSITE RIM PRODUCED BY RESIN TRANSFER MOLDING

CROSS-REFERENCE TO RELATED APPLICATIONS

This application is a continuation of International Application No. PCT/EP03/02346 filed 7 Mar. 2003 and published as WO2003/076212 in the French language on 18 Sep. 2003, and which claims priority to French National Application No.: 02/030304 filed 11 Mar. 2002.

BACKGROUND OF THE INVENTION

1. Field of the Invention

The subject of the invention is a wheel, composed of a disc and a rim, for a tire, able possibly to form, with a support ring for the tread of the tire and the tire, a rolling assembly which may be useful in the case of running when the inflation pressure drops abnormally relative to the normal pressure of use, referred to as rated service pressure, which pressure may possibly even become zero.

2. Description of the Related Art

The main difficulties encountered in the case of running on a flat tire or at low pressure relate to the risk of unseating of the beads of the tire and in particular the unseating of the bead located on the outside of the tire mounted on the outside of the vehicle when cornering. The well-known proposed techniques for avoiding such unseating, and in particular the one consisting of arranging a protrusion or hump of low height axially to the inside of the outer rim seat, do not appear to be completely satisfactory and tend to increase the difficulties of mounting and dismounting the tires.

U.S. Pat. No. 6,470,936 (which is a counterpart to Application WO 00/05083) describes by way of example, in order to solve the above problem effectively, an integral wheel such as shown in FIG. 1A. This wheel has a radially outer geometry comprising a first and a second seat which are intended to receive a tire bead, at least the first seat having a generatrix, the axially outer end of which is on a circle of diameter less than the diameter of the circle on which the axially inner end is located, said seats being extended axially to the outside by a protrusion or "hump" of low height, the first seat being extended axially to the inside by a cylindrical surface intended to receive a tread support ring. This wheel is such that the cylindrical surface is formed of a first and a second zone which are separated by a circumferential groove which opens out radially externally. It may be produced by molding an aluminum alloy in a single operation.

The presence of the circumferential groove is intended to reduce the weight of the wheel significantly. This wheel, which is optimized in terms of weight, does however have the drawback, when the outer profile comprises a mounting groove for a tire, of permitting the accumulation, beneath the axially outer portion relative to the mounting groove of the inner profile of the rim of this wheel, of all sorts of materials, such as mud mixed to a greater or lesser extent with stones, such as snow or ice in winter conditions, which materials are difficult to evacuate.

BRIEF SUMMARY OF THE INVENTION

In order to make it possible to obtain optimum lightness and to overcome the above drawbacks, the wheel, according to the invention, has a radially outer geometry which comprises a first and a second seat which are intended to receive a tire bead, at least the first seat having a generatrix, the axially outer end of which is on a circle of diameter less than the diameter of the circle on which the axially inner end is located, said seats being extended axially to the outside by a protrusion or hump of low height, said first seat being extended axially to the inside by a cylindrical surface. This wheel is characterized in that it is formed by the assembly:

of a disc comprising a hub bearing surface, a transition zone and a zone for attaching to the rim located substantially at the minimum diameter of the rim, and of a rim with:
  at least a first laminated composite structure formed of at least one fabric of long fibers which are oriented in two distinct directions and impregnated by a cross-linked resin, the radially outer surface of which corresponds to the radially outer surface of said rim or to part thereof,
  at least a second laminated composite structure formed of at least one fabric of long fibers which are oriented in two distinct directions and impregnated by a cross-linked resin, the radially outer surface of which corresponds to the radially inner surface of said rim or to part thereof; and
  at least a circumferential weight-reduction structure formed of a material of low density, arranged radially between said first and second laminated composite structures.

Preferably, the radially inner surface of the rim has an axial distance which gradually decreases from said second seat as far as the zone of assembly with the disc.

This wheel has numerous advantages. The fact that the rim comprises one or more circumferential weight-reduction structures formed of a material of low density makes it possible to dissociate the radially outer and inner profiles of the two composite structures. It is thus possible to associate an inner profile guaranteeing no retention of water, ice or various materials with an outer profile with a mounting groove of depth suitable for easy mounting and dismounting of the tire intended to be fitted on this wheel. These circumferential structures of low density permit a substantial reduction in weight of the rim while retaining very satisfactory inertia of the axially inner part of the rim.

The production of the wheel in two parts also gives the disc great freedom of style which may be brought about by any appropriate molding, forging, etc. process.

Preferably, the rim of the wheel is produced by the RTM (Resin Transfer Molding) process. In this process, the reinforcement materials, such as fibers of glass, carbon or any other type of fibers, are prearranged in the cavity of a mould. These reinforcement materials thus constitute the "preform" of the final composite piece. This operation of placement and structuring of the reinforcements is referred to as "preforming". The resin is then transferred via the preform into the mould under a vacuum and/or with a transfer pressure and is then cross-linked at the appropriate temperatures.

The dry reinforcement fabrics are formed into the final shape of the laminated composite structures using a process similar to the one described in U.S. Pat. No. 5,985,072 (which is a counterpart to Patent EP 0 842 757). In this process, a rim preform or rim element preform having an axis of revolution is produced by placing fibers pre-assembled in two orientations defining deformable meshes on a preforming die. A winding of a strip of the fibers is fixed over a circumference of the preforming die with a dissymmetrical orientation of the fibers, and then it is applied gradually until it covers the entire surface of the preforming die, subjecting it to tensions of substantially circumferential orientation.

An example of fabric 204 intended to produce a preform is shown in FIG. 1B. This fabric 204 is formed of filling fibers 205 and warp fibers 206 which form an angle γ with each other. Such a fabric 204 can be considered to be formed of unit meshes of sides a and b. These lengths a and b correspond to the distance between two filling fibers 205 and warp fibers 206 placed in the same weaving configuration. When the fabric 204 is pulled in a direction different from that of the filling fibers 205 and warp fibers 206, each unit mesh of the fabric 204 is deformed to form a parallelogram; the lengths a and b remain constant, but the angle γ changes. The maximum and minimum limits of γ can be measured experimentally: $\gamma_{max}$ and $\gamma_{min}$ (FIG. 1C). The fabrics used in the method of the invention are preferably γ angles on the order of 90 degrees. Fabrics having values of γ ranging by ±30 degrees from 90 degrees can also be used.

On the other hand, the circumferential structures formed of a material of low density are molded or machined into the desired form. The preforms of fabric and also the circumferential structures of low density are positioned in the mould. Resin is injected at low pressure. The resin impregnates the fabrics, but does not penetrate into the circumferential structures of low density. These structures of low density must have sufficient rigidity to withstand the injection pressure of the resin without excessive deformation.

The final structure obtained is a sandwich structure comprising external skins having high levels of mechanical properties and cores corresponding to the structures of low density having limited properties. Laminated composite reinforcement structures may be positioned at the level of the two seats of the rim. These reinforcements make it possible to increase the rigidity of the seats of the rim, which is necessary most of the time to avoid excessively rapid unseating of the beads of the tire when the inflation pressure increases.

Preferably, the circumferential weight-reduction structures are formed of a material of low density selected from the group of polyurethane (PU), polystyrene and polyvinyl chloride (PVC) foams, syntactic foams (such a foam may be an epoxy resin mixed with hollow glass beads) and balsa (lightweight wood).

According to one specific embodiment, the radially outer edge of the disc extends axially and radially until it forms at least the axially outer end of the outer hump. This makes it possible to produce wheels of "full-face" design easily.

Another subject of the invention is also a wheel for a tire formed by the assembly:

of a disc comprising a hub bearing surface, a transition zone and a radially outer edge; and of a rim formed:

of at least a first laminated composite structure formed of at least one fabric of long fibers which are oriented in two distinct directions and impregnated by a thermohardening resin, the radially outer surface of which corresponds to the radially outer surface of said rim or to part thereof, of at least a second laminated composite structure formed of at least one fabric of long fibers which are oriented in two distinct directions and impregnated by a thermohardening resin, the radially outer surface of which corresponds to the radially inner surface of said rim or to part thereof, and of at least a circumferential weight-reduction structure formed of a material of low density, arranged radially between said first and second laminated composite structures.

BRIEF DESCRIPTION OF THE DRAWING

A number of embodiments will now be described, in non-limitative manner, with reference to the appended drawings.

DETAILED DESCRIPTION OF THE INVENTION

Figure 1A:
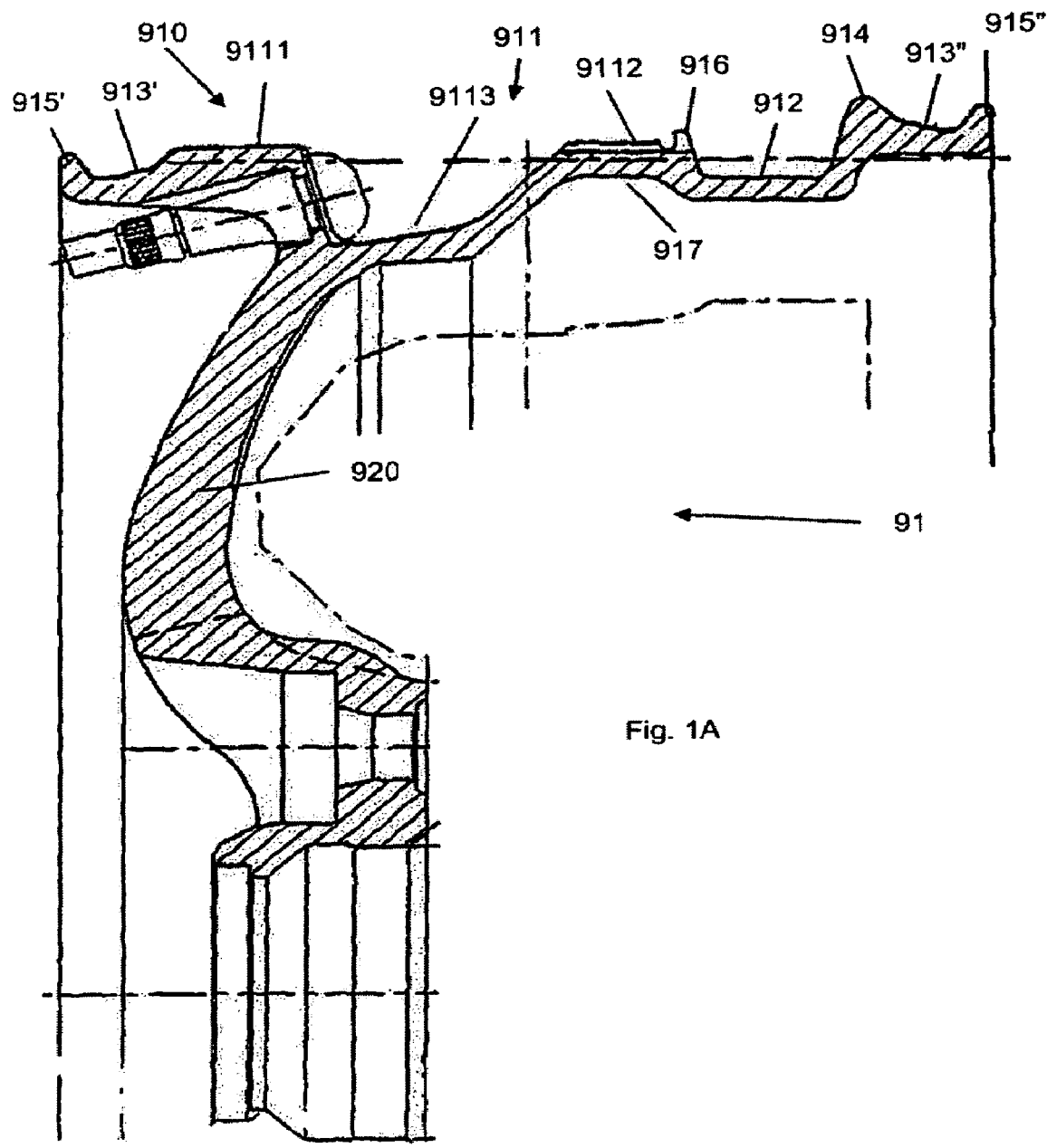
FIG. 1A is the prior art wheel of FIG. 3 of U.S. Pat. No. 6,470,936, viewed in meridian section.
Figure 1B:
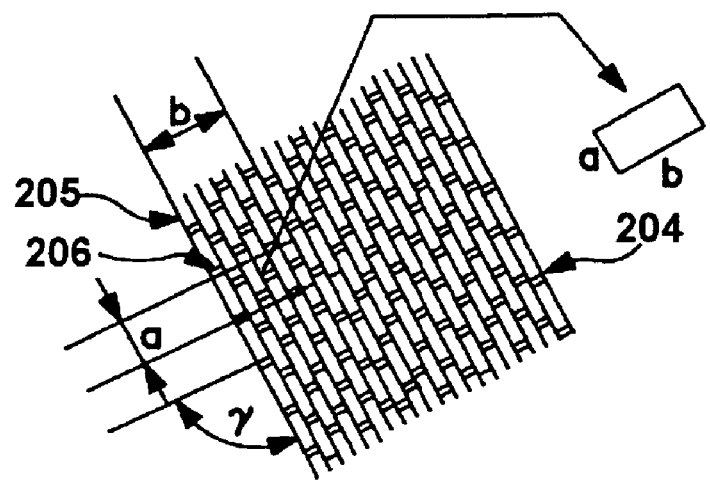
FIG. 1B shows a reinforcement fabric, as in the prior art.
Figure 1C:
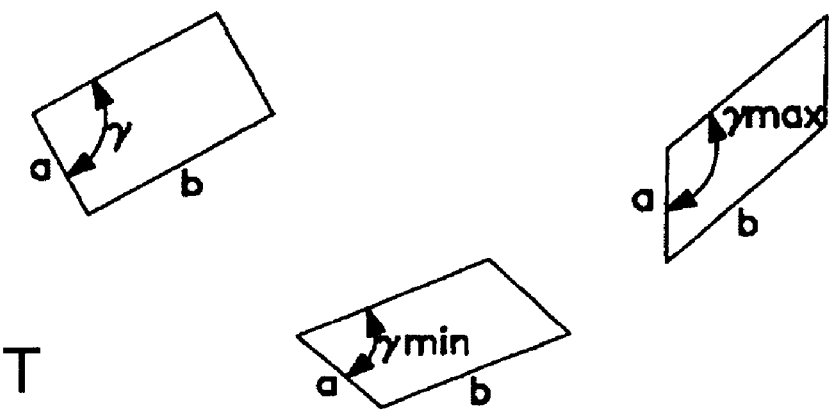
FIG. 1C illustrates the deformability of a fabric such as that of FIG. 1B, as in the prior art.

FIG. 1A shows, in a meridian diagrammatic view, an integral wheel 91 such as disclosed by U.S. Pat. No. 6,470,936. This wheel comprises a rim 910 and a disc 920. The rim 910 comprises two rim seats, an outer one 913' and an inner one 913", the generatrices of which are inclined towards the outside. The two seats are extended externally by protrusions or humps 915' and 915". The outer seat 913' is extended axially towards the inside by a cylindrical surface or bearing surface 911, which itself is provided at its other end with a stop 916 for positioning a support ring intended to be mounted on this bearing surface 911. The inner seat 913" is extended axially to the inside by a rim flange 914, which flange defines a mounting groove 912 together with the positioning stop 916. The bearing surface 911 comprises two parts 9111 and 9112 which are separated axially by a circumferential groove 9113 opening out radially externally. The diameters of the two seats 913' and 913" are not identical: the first seat 913', which is arranged on the outer side of the wheel 91, has a diameter less than that of the second seat 913". This makes it possible to reduce the depth of the mounting groove 912.

The two parts 9111 and 9112 of the cylindrical surface or bearing surface 911 are adapted to support a support ring for the tread of the tire intended to be fitted on this wheel. Such rings are, by way of example, described in U.S. Pat. No. 5,891,279 (which is a counterpart to application EP 0 796 747) and U.S. Pat. No. 6,564,842 (which is a counterpart to application FR 99/07469).

The circumferential groove makes it possible to reduce substantially the weight of the wheel 91 and facilitates the production thereof. Despite the limited depth of the mounting groove 912, this wheel has radially internally a zone 917 adjacent to the mounting groove 912 favorable to the accumulation of various materials.

Figure 2:
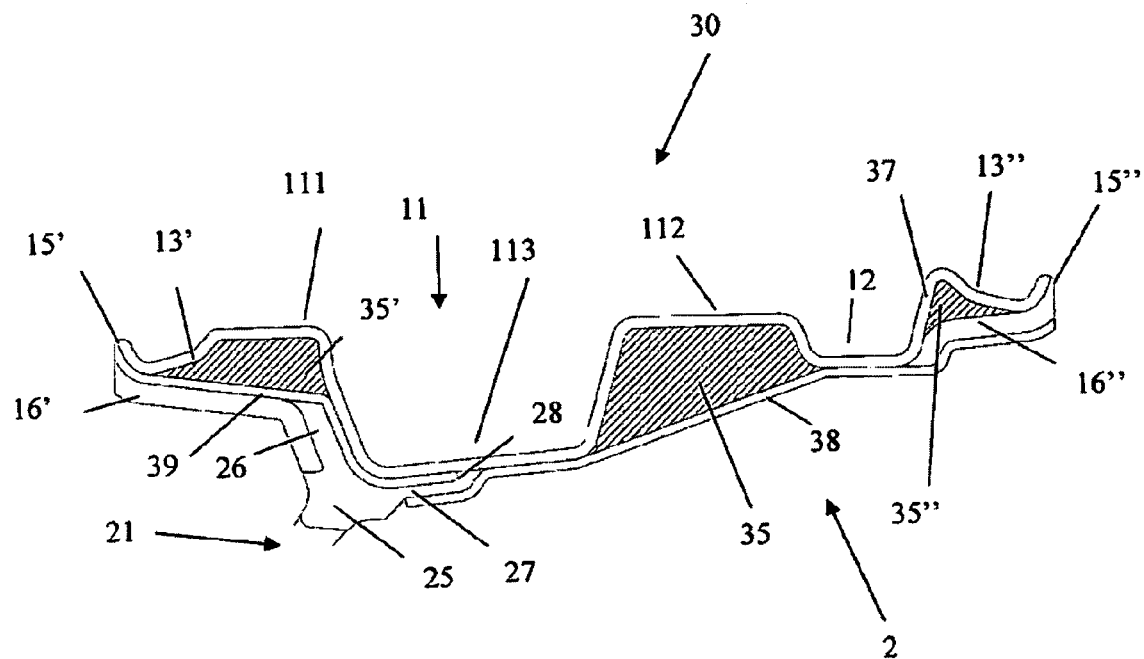
FIG. 2 is a view in meridian section of a first embodiment of a wheel according to the invention.

FIG. 2 shows a first embodiment of a wheel according to the invention. This wheel 2, which is an integral wheel, is formed by the assembly of a disc 21 and a rim 30. The radially outer geometry of the rim 30 of this wheel 2 is entirely similar to that of the wheel 1: there are in particular two seats 13' and 13", extended axially externally by two humps 15' and 15", a cylindrical surface comprising two parts 111 and 112 which are separated by a circumferential groove 113 and a mounting groove 12.

On the other hand, the radially inner profile of this wheel is very substantially different since the diameter decreases continuously between the inner seat 13" and the connection to the transition zone 25 of the disc 21. This profile does not have any zone favorable to the accumulation of various materials. This result is obtained due in particular to the presence in the rim of a circumferential structure 35 formed of a material of low density and arranged beneath the part 112 of the cylindrical surface or bearing surface 11. The radially outer profile of such a rim corresponds to the profile of the rim of the wheel 1. This circumferential structure thus makes it possible to dissociate the radially inner and outer profiles of the wheel.

The rim 30 also comprises two other circumferential weight-reduction structures arranged beneath the rim seats: the structure 35' beneath the outer seat 13', the structure 35" beneath the inner seat 13". The structure 35' also extends beneath the part 111 of the bearing surface 11. Here too, the presence of these circumferential weight-reduction structures makes it possible to dissociate the inner and outer profiles of the rim.

It should be noted that the embodiment of the rim does not make it possible to produce a stop for the support such as the stop 16 present in FIG. 1A of the metal wheel. The lateral blocking of the support in the direction of the interior of the vehicle must be effected using a different means. This blocking can be effected, for example, by modifying the base of the supports and/or the diameters of the bearing surfaces 111 and 112. For example, there may be two different internal diameters for the base of the supports and the bearing surfaces 111 and 112 such that the smaller diameter can pass over the diameter of the zone 111, but not over the diameter of the zone 112. The support is then blocked in the direction of the interior of the vehicle. An example of such a rim geometry is given in FIG. 7 of U.S. Pat. No. 6,470,936.

The rim 30 also comprises local reinforcement structures 16' and 16" beneath the humps 15' and 15". These local reinforcement structures are laminated composite structures formed of at least one fabric of long fibers which are oriented in two distinct directions and impregnated by the thermohardening resin at the same time as the rest of the structure of the wheel.

In the case of a wheel dimension 205×460 A, 205 being the width of the wheel in millimeters and 460 the nominal diameter of the wheel, A stands for asymmetrical (the two seats are of different diameters), a comparison of the masses between the wheels of type 1 and 2 gives a reduction in mass of the order of 1.5 kg in favor of the wheel 2, the laminated composite structures being made from glass fibers and resin. This saving in mass is due both to the beneficial characteristics of the composite material used with regard to its density and to the use of the circumferential structures of low density.

The rim 30 is obtained by positioning preforms produced in accordance with U.S. Pat. No. 5,985,072 and molded or machined elements 35, 35' and 35" of low density.

More precisely, in order to manufacture the rim 30, one commences by putting in place in the mould the preform 38 which corresponds to the radially inner profile of the rim, on the inner side of the vehicle, then the local reinforcement structure 16". Then the preform 37 which corresponds to the radially outer profile of the rim is positioned, having taken care to put the three circumferential weight-reduction structures 35, 35' and 35" in place in this preform beforehand.

Then the radially outer edge 25 of the disc 21 and the preform 39 are positioned between the preforms 37 and 38. To finish, the local reinforcement structure 16' may be added. The mould can then be closed. Once the mould is closed, a resin is injected, impregnates the reinforcement fibers, and polymerizes under the action of heat. Thus, the preforms 37, 38, and 39 become laminated composite structures. The resin used is a conventional thermohardening resin of polyester, vinylester, or epoxy type.

The radially outer edge 25 of the disc 21 has its geometry adapted to be able to accommodate the preform 39. Once the impregnation and the polymerization have been carried out, the axial forces tending to separate the rim from the disc are mainly absorbed by the embedding of the branch 26 of the radially outer edge 25 of the disc 21 between the preform 39 and the reinforcement structure 16' and also by the embedding of the branch 27 of the radially outer edge 25 between the preform 39 and the preform 38. This mechanical connection system between the disc and the rim exploits the flexibility of the preform 39 when the disc is put in place in the mould. This does not cause a problem in practice because the preforms are of low rigidity.

Figure 3:
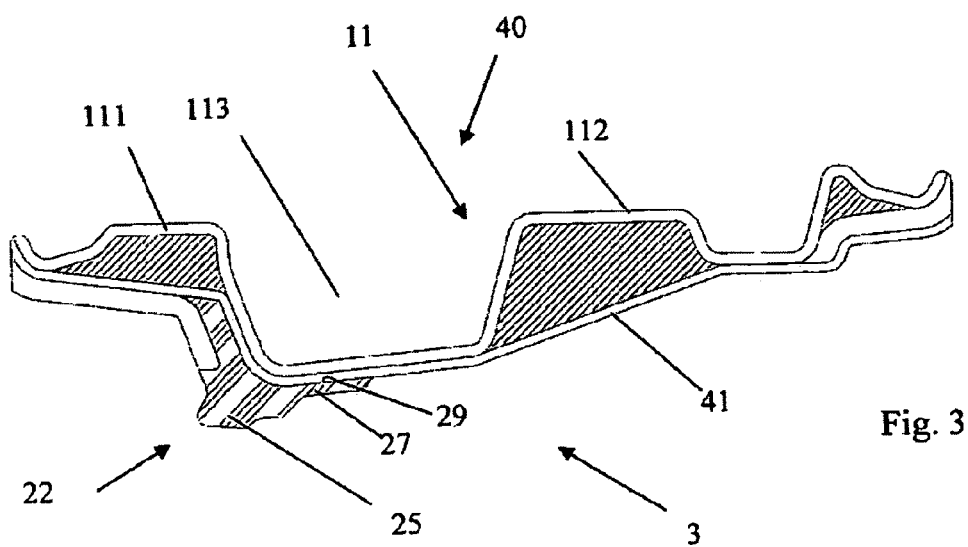
FIG. 3 is a view in meridian section of a second embodiment, which is a variant of the embodiment of FIG. 2.

FIG. 3 shows a second embodiment of a wheel 3, which is a variant embodiment of the wheel 2. The rim 40 of this wheel 3 is distinguished from the rim 30 by the geometry of the disc/rim connection zone. With this type of connection, the connection is mainly produced by gluing. The disc 22 is prepared chemically before the injection of resin. Upon polymerization of the resin, chemical gluing takes place. The radial forces this time are absorbed mainly by the shearing of the glue on the surface 29, the connection zone between the axially inner branch 27 of the radially outer edge 25 of the disc 22 and the preform 41 of the rim 40. Here, the preform 41 can extend axially over the entire radially inner profile of the rim 40.

The circumferential groove 113 of the two wheels 2 and 3 may in particular serve for putting in place a wheel module including a pressure sensor of a system for monitoring the pressure of the tires of a vehicle. Such location does not in any way disturb the mounting and the dismounting of the tire.

The supports intended to be slipped on to the cylindrical surface 11 conventionally have a width such that they bear on the two parts 111 and 112 of this surface or bearing surface.

Figure 4:
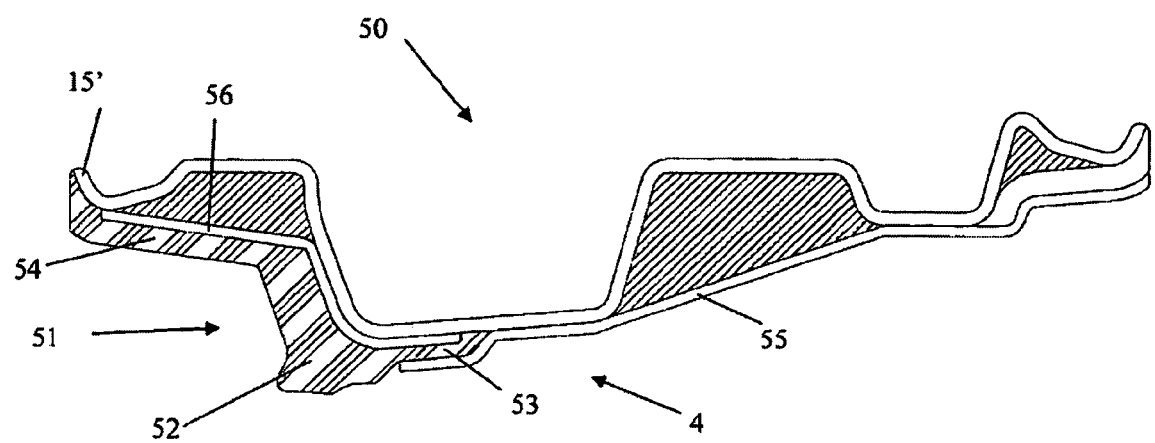
FIG. 4 is a view in meridian section through a third embodiment of a wheel according to the invention.

FIG. 4 shows a third embodiment of a wheel according to the invention. The wheel 4 has a metal disc 51 which has the property of extending as far as the hump 15' of the rim 50. The radially outer edge 52 of the disc 51 has its branch 54 which extends until it forms the axially outer end of the hump 15'. The second branch 53 of this radially outer edge 52 is embedded as previously (see FIG. 2). The radially inner profile is obtained here with two preforms 55, 56 as previously. This type of disc makes it possible to dispense with the local reinforcement 16' (see, e.g., FIG. 2) beneath the hump 15', because the metal disc most of the time provides the necessary rigidity in this zone. This type of connection furthermore makes it possible to obtain easily what are called 'full-face' designs for the wheel.

Figure 5:
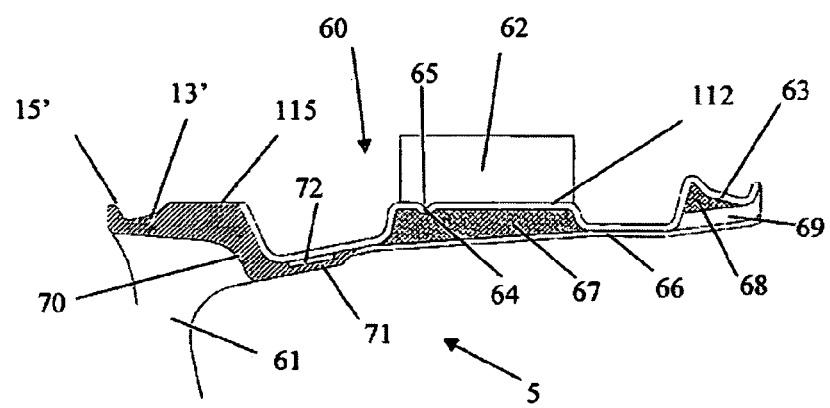
FIG. 5 is a view in meridian section through a fourth embodiment of a wheel according to the invention.

FIG. 5 shows a fourth embodiment of a wheel according to the invention. In this variant, the wheel 5 is designed to receive a support 62 of reduced weight. Only the cylindrical zone 112 is intended to support this support. The disc 61 formed of a metallic material extends axially and radially as far as the hump 15' but also forms the seat 13' and a cylindrical zone 115 of the rim 60. The cylindrical zone 115 does not support the support 62, and is in direct contact with the internal air of the tire. This direct contact with the internal air makes it possible to evacuate some of the heat generated when running on a flat tire. Thus the insulating nature of the composite rim will have little adverse effect on the performance of the supports when running on a flat tire.

This rim 60 comprises a preform 63 providing the radially outer profile of the rim. This preform is molded such that it comprises a groove 64 intended to cooperate with a protrusion 65 of the support 62 to axially block the support. The radially inner profile of the rim 60 is provided by a preform 66. Between the two preforms 63 and 66 there are arranged two circular weight-reduction structures 67 and 68 and also a reinforcement structure 69. The radially outer edge 70 of the disc 61 comprises a branch 71 which is embedded between the preform 66 and a circumferential structure 72 in order to obtain a mechanically solid connection between the disc 61 and the rim 60.

All the examples shown, in non-limitative manner, demonstrate the advantage of dissociating the inner and outer profiles of the wheel linked to the process selected for producing the rims. All together, they also demonstrate the flexibility which the designer of the wheel has to meet his needs. This process has been presented in particular in the context of a very specific geometry of the rim, but it can be applied to all types of known rim profiles.

The invention claimed is:

1. A tire wheel that includes a first seat and a second seat, intended to receive a tire bead, and an assembly, said tire wheel comprising:
    a disc that includes a hub bearing surface, a transition zone and a radially outer edge; and
    a rim that includes:
        at least a first laminated composite structure formed of one circumferential winding of a fabric of long fibers, said fibers being oriented in two distinct directions and impregnated by a resin, a radially outer surface of said first composite structure corresponding to a portion of a radially outer surface of said rim;
        at least a second laminated composite structure formed of one circumferential winding of a fabric of long fibers, said fibers being oriented in two distinct directions and impregnated by a resin, a radially outer surface of said second composite structure corresponding to a portion of a radially inner surface of said rim; and
        at least a first circumferential weight-reduction structure, filling a portion of an annular volume of said rim, said first weight-reduction structure being formed of a material of a density substantially lower than a density of said first and second laminated composite structures, so as to provide reduced rim weight, and said first weight-reduction structure being arranged radially between said first and second laminated composite structures, wherein a radially inner profile of said tire wheel, formed by said radially inner surface of said rim, has a diameter that decreases between a region opposite a mounting groove of said radially outer surface of said rim and a region opposite a circumferential groove of said radially outer surface of said rim.

2. A tire wheel according to claim 1, in which said radially inner surface of said rim has an axial distance that decreases from a first axial location at said second seat to a second axial location at a zone of assembly with said disc.

3. A tire wheel according to claim 1, in which said first seat includes a complementary circumferential reinforcement structure.

4. A tire wheel according to claim 1, in which said second seat includes a complementary circumferential reinforcement structure.

5. A tire wheel according to claim 3, in which said complementary circumferential reinforcement structure includes a laminated composite structure.

6. A tire wheel according to claim 1, in which said first seat includes a circumferential weight-reduction structure.

7. A tire wheel according to claim 1, in which said second seat includes a circumferential weight-reduction structure.

8. A tire wheel according to claim 1, in which said first circumferential weight-reduction structure is formed of a material of low density selected from the group consisting of polyurethane foam, polystyrene foam, polyvinyl chloride foam, syntactic foam, and balsa.

9. A tire wheel according to claim 1, in which at least said first seat has a generatrix, an axially outer end of which is on a circle of diameter less than a diameter of a circle on which an axially inner end is located, at least said first seat being extended axially to an outside by a protrusion or hump of low height, and at least said first seat being extended axially to an inside by a cylindrical surface.

10. A tire wheel according to claim 1, in which said first circumferential weight-reduction structure is arranged axially between said first seat and said mounting groove.

11. A tire wheel according to claim 9, in which said cylindrical surface includes two bearing surfaces arranged axially on either side of said circumferential groove, and said first circumferential weight-reduction structure is arranged axially between said first seat and said circumferential groove and a second circumferential weight-reduction structure is arranged axially between said circumferential groove and said mounting groove.

12. A tire wheel according to claim 9, in which said radially outer edge of said disc extends axially and radially until it forms an axially outer end of said hump.

13. A tire wheel according to claim 9, in which said radially outer edge of said disc extends axially and radially until it forms said first seat, said hump of said first seat and said cylindrical surface adjacent to said first seat of said rim.

* * * * *

UNITED STATES PATENT AND TRADEMARK OFFICE
CERTIFICATE OF CORRECTION

PATENT NO. : 7,309,110 B2
APPLICATION NO. : 10/938672
DATED : December 18, 2007
INVENTOR(S) : Yves Vernet et al.

It is certified that error appears in the above-identified patent and that said Letters Patent is hereby corrected as shown below:

[73] ASSIGNEE

"Michelin Recherche et Technique S.A. (CH)" should read
--Michelin Recherche et Technique S.A., Granges-Paccot (CH)--.

[56] REFERENCES CITED

U.S. Patent Documents
"Wlcox" should read --Wilcox--.

COLUMN 4

Line 15, "art." should read --art;--.

Signed and Sealed this

Sixth Day of May, 2008

JON W. DUDAS
*Director of the United States Patent and Trademark Office*